United States Patent [19]

Gault

[11] 4,173,468

[45] Nov. 6, 1979

[54] ALLOY FOR SOLDERING ALUMINUM

[76] Inventor: Frank M. Gault, 148 High Tor Dr., Watchung, N.J. 07060

[21] Appl. No.: 903,073

[22] Filed: May 5, 1978

[51] Int. Cl.$^2$ .............................................. C22C 11/00
[52] U.S. Cl. ................................ 75/134 N; 75/134 B; 75/134 D; 75/166 D
[58] Field of Search ............. 75/166 B, 134 B, 134 D, 75/175 A, 166 R, 134 N; 428/652

[56] References Cited

U.S. PATENT DOCUMENTS

| | | | |
|---|---|---|---|
| 2,157,121 | 5/1939 | Darby et al. | 75/166 |
| 2,446,996 | 8/1948 | Bouton et al. | 117/131 |
| 2,486,202 | 10/1949 | Phipps | 75/166 |
| 2,508,488 | 5/1950 | Bouton et al. | 113/112 |
| 2,623,273 | 12/1952 | Murray et al. | 29/180 |
| 2,685,893 | 8/1954 | Phipps | 138/25 |
| 2,993,785 | 7/1961 | Borchers et al. | 75/166 |
| 3,716,909 | 2/1973 | Stokes et al. | 29/504 |
| 3,769,007 | 10/1973 | Stokes et al. | 75/166 B |

OTHER PUBLICATIONS

Lead and Lead Alloys, Ed. W. Hofmann, Springer, N.Y. 1970, pp. 129–132.

*Primary Examiner*—L. Dewayne Rutledge
*Assistant Examiner*—Upendra Roy

[57] ABSTRACT

An improved alloy especially suitable for soldering aluminum to aluminum or aluminum to other metals which has a base containing bismuth, lead and/or cadmium to which is added the following in small amounts: silver, antimony, cobalt, copper, manganese and nickel. The resulting alloy has a melting and flowing temperature below 550° F. and exhibits improved resistance to interface corrosion by virtue of an intermetallic compound layer formed at the interface.

1 Claim, No Drawings

ALLOY FOR SOLDERING ALUMINUM

This invention relates to alloy used to join metals by the soldering process.

For many years, industry has used various solder alloys containing tin, lead, cadmium, zinc, antimony, bismuth, silver and indium to join other metals and alloys for such applications as electric motors, water piping, air conditioning equipment, automotive parts, food handling equipment and electronic gear.

The most common solder alloys are combinations of tin and lead, sometimes with additions of antimony. These solders offer good relative strengths, desirable melting and flowing characteristics and moderate overall costs. There are also many special solder alloys made for specific requirements. Tin-silver, for example, is popular for instrument work. Tin-antimony and lead-silver alloys are used for higher temperature service. And the high bismuth content solders, the so-called fusible alloys, are used where low melting temperatures are wanted.

Solders have been useful in joining copper, copper alloys, steel, stainless steel, nickel alloys and other metals and alloys. However, when they have been used on aluminum and aluminum alloys, the results have been erratic. The bonds these solders form are usually strong and serviceable when first made, but when exposed to water or high humidity, corrosion occurs which causes the bonds to fail. The corrosion usually takes place at the interface of the joint, the thin area where the solder adheres to the aluminum base metal. Apparently, the solder, while it is molten, alloys with the aluminum. The resulting layer at the interface (a mixture of solder metal and aluminum) has a higher galvanic potential (more likely to corrode) than either the solder or the base aluminum. Corrosion is concentrated, therefore, in this thin interface and proceeds rapidly, causing failure of the joint. To slow this process down, solders which have galvanic potentials close to that of aluminum have been used. Some of these are: tin-zinc, zinc and zinc-aluminum. These solders have been helpful, but they have not solved the problem of corrosion completely.

I have discovered that compositions of bismuth-lead-silver, bismuth-cadmium-silver and bismuth-lead-cadmium-silver control interface corrosion. While these metals are common constituents of solders, these particular combinations are unique. Furthermore, they operate to solve this corrosion problem by a novel method, by promoting the formation of high temperature intermetallic compounds at the joint interface.

At low temperatures (200° to 550° F.), bismuth, lead and cadmium have a minimal alloying reaction with aluminum. They dissolve very little of the base aluminum and combine with it but slightly. However, bismuth, lead or cadmium used by themselves or in any combination together, even this slight reaction produces an interface highly vulnerable to attack by corrosion. Silver, on the other hand, reacts with aluminum readily to form a number of high temperature intermetallic compounds and these compounds are highly corrosion resistant. Even when small amounts of silver are added to bismuth-lead, bismuth-cadmium or bismuth-lead-cadmium, the ability of silver to form these high temperature and corrosion resistant compounds with aluminum is concentrated at the interface. There is very little mixing and alloying action to interfere with the formation of a uniform silver-aluminum intermetallic compound interface layer. Thus, the bulk of the solder (bismuth-lead, bismuth-cadmium or bismuth-lead-cadmium) is a relatively passive carrier of a reactive interface control element, silver.

It might seem that existing solders containing silver might work in similar fashion, but they do not. Joints made with tin-silver, for example, fail rapidly due to interface corrosion. Tin dissolves aluminum readily and alloys with it. This mixing and alloying action overrides the ability of silver to form a consistent intermetallic layer and to stabilize the interface. Joints made with lead-silver and cadmium-silver also fail rapidly through interface corrosion. These are high temperature solders and at higher temperatures lead and cadmium are no longer passive toward aluminum. Their reaction with aluminum is progressive with increases in temperature and they dissolve aluminum and alloy with aluminum to a much greater degree when heated above 550° F. This dissolving and alloying action overrides the ability of silver to stabilize the interface. Bismuth added lowers the melting and flowing temperatures of solders keeping lead and cadmium within their most passive temperature range in relationship to aluminum.

Thus, this invention consists of a body of solder which has a minimal mixing and alloying reaction with aluminum and which both melts and flows at temperatures below 550° F., thereby keeping the alloying action minimal. To this passive body of solder is added a metal or metals which react with aluminum to form high temperature and chemically stable intermetallic compounds. The result is a solder which produces a stable, corrosion resistant interface when melted on aluminum and aluminum alloys.

I have further discovered that there are other metals which can be used with bismuth-lead, bismuth-cadmium and bismuth-lead-cadmium to control and stabilize the joint interface. Antimony, for example, forms a high temperature compound with aluminum and this compound is corrosion resistant. An alloy of antimony combined with bismuth and lead in the absence of tin is unique. Superficially, small percentages of tin might be tolerated, but any quantity is detrimental and should be avoided. Antimony is very compatible with bismuth and lead and is much less costly than silver. Solders containing silver make superior joints on copper, copper alloys and steel and would be preferred when joining aluminum to these other metals. However, when joining aluminum to aluminum, an alloy containing antimony would be preferred because of its lower cost.

I have discovered that other metals are also useful as agents to control the make-up of the interface between solder and aluminum. These others are not very compatible with bismuth, lead and cadmium, but have demonstrated ability to meet the basic requirements of increasing the resistance of the joint interface to corrosion. Included are: cobalt, copper, manganese and nickel.

The objective of my invention is to provide solder which can be used to join aluminum to aluminum or aluminum to other metals and alloys. This solder is to provide the ease of handling and application consistent with normal soldering practice and to produce solder joints of reasonable strength and serviceability, and remain so even in corrosive environments. I have discovered that these objectives are accomplished when a uniform high temperature intermetallic compound layer (such as silver-aluminum or antimony-aluminum) is established at the solder-aluminum interface, and that this can be accomplished by adding silver, antimony or previously named metals which form high temperature compounds with aluminum to low temperature melting and flowing alloys of bismuth-lead, bismuth-cadmium or bismuth-lead-cadmium.

As indicated by previous exposition, a solder alloy could contain, by weight, from 5.0 to 65.0 percent bismuth, 0.05 to 95.0 percent lead, 0.05 to 55.0 percent cadmium, 0.05 to 10.0 percent silver, 0.05 to 15.0 percent antimony, 0.005 to 5.0 percent cobalt, 0.005 to 5.0 percent copper, 0.005 to 5.0 percent manganese and 0.005 to 5.0 percent nickel. As example of composition which have been found specifically and particularly satisfactory for joining aluminum by the soldering process and included within the general specification:

| | | |
|---|---|---|
| 1. Bismuth | 22.0 | percent |
| Lead | 75.0 | percent |
| Silver | 2.93 | percent |
| Antimony | .05 | percent |
| Cobalt | .005 | percent |
| Copper | .005 | percent |
| Manganese | .005 | percent |
| Nickel | .005 | percent |
| 2. Bismuth | 48.63 | percent |
| Lead | .05 | percent |
| Cadmium | 48.63 | percent |
| Silver | 2.62 | percent |
| Antimony | .05 | percent |
| Cobalt | .005 | percent |
| Copper | .005 | percent |
| Magnanese | .005 | percent |
| Nickel | .005 | percent |
| 3. Bismuth | 23.3 | percent |
| Lead | 44.3 | percent |
| Cadmium | 30.3 | percent |
| Silver | 2.03 | percent |
| Antimony | .05 | percent |
| Cobalt | .005 | percent |
| Copper | .005 | percent |
| Manganese | .005 | percent |
| Nickel | .005 | percent |
| 4. Bismuth | 21.84 | percent |
| Lead | 72.54 | percent |
| Cadmium | .05 | percent |
| Silver | .05 | percent |
| Antimony | 6.5 | percent |
| Cobalt | .005 | percent |
| Copper | .005 | percent |
| Manganese | .005 | percent |
| Nickel | .005 | percent |
| 5. Bismuth | 48.74 | percent |
| Lead | 48.64 | percent |
| Cadmium | .05 | percent |
| Silver | 2.5 | percent |
| Antimony | .05 | percent |
| Cobalt | .005 | percent |
| Copper | .005 | percent |
| Manganese | .005 | percent |
| Nickel | .005 | percent |

While the primary purpose of this invention is to provide improved alloy for soldering, the joining of two or more pieces of metal together, it is also possible to use solder to coat the surface of metal. For example, aluminum electrical wires or electrical fittings can be coated with improved solder to prevent oxidation from decreasing electrical conductivity, then later mechanically spliced to or wrapped with copper wires to effect a durable and electrically stable junction without actually soldering the aluminum and the copper together. Preferred composition for this application would include:

| | |
|---|---|
| Bismuth | 21.0 percent |
| Lead | 74.0 percent |
| Silver | 5.0 percent |

When both parts to be joined mechanically for an electrical junction are aluminum, they could be precoated with solder. Preferred composition for this application would include:

| | |
|---|---|
| Bismuth | 21.5 percent |
| Lead | 71.5 percent |
| Antimony | 7.0 percent |

For soldering aluminum to aluminum or to other metals, a flux must be used to remove existing oxides from the metal surfaces and to protect base metals and solder while undergoing the heating cycle. Reaction fluxes which depend upon a chemical reduction of tin or zinc salts by the base aluminum are to be avoided because tin or zinc is deposited on the surface of the aluminum. These metals then become part of the joint interface or alloy with the solder. Both tin and zinc are detrimental to effecting a corrosion resistant bond. Since this solder melts and flows at low temperatures, chemical fluxes such as those containing boron trifluoride-monoethanolamine can be used. There are a number available commercially. However, a few contain metal salts as accelerators. Care must be taken to use a chemical flux that does not deposit tin or zinc on the surface of the aluminum. Fluxes depositing no metal would be safest, or one using a bismuth or lead salt as an accelerator.

Also, it should be apparent that this solder need not be confined to use on aluminum and aluminum alloys. It is possible that in some instances this alloy might find uses on copper, copper alloys, steels, nickels and other alloys, although this solder is not specifically engineered for them. Accordingly, the references of application of this alloy with aluminum and aluminum alloys should be considered as illustrative and not as limiting the scope of the following claims.

I claim:

1. A solder alloy composition consisting, by weight, 5.0 to 65.0 percent bismuth, 0.05 to 95.0 percent lead, 0.05 to 55.0 percent cadmium, 0.05 to 10.0 percent silver, 0.05 to 15.0 percent antimony, 0.005 to 5.0 percent cobalt, 0.005 to 5.0 percent copper, 0.005 to 5.0 percent manganese and 0.005 to 5.0 percent nickel.

* * * * *